United States Patent [19]

Bourgault et al.

[11] Patent Number: 5,029,757
[45] Date of Patent: Jul. 9, 1991

[54] AUTO-FOLD SPRAYER

[75] Inventors: Gerard Bourgault; Stanley Boyko, both of St. Brieux, Canada

[73] Assignee: F. P. Bourgault Industries Air Seeder Division Ltd., St. Brieux, Canada

[21] Appl. No.: 496,242

[22] Filed: Mar. 20, 1990

[30] Foreign Application Priority Data

Sep. 29, 1989 [CA] Canada .................................. 614513

[51] Int. Cl.⁵ .............................................. B05B 1/20
[52] U.S. Cl. .................................. 239/167; 239/169; 239/170; 239/175
[58] Field of Search .............................. 239/159–161, 239/163, 164, 166–170, 172, 175, 176

[56] References Cited

U.S. PATENT DOCUMENTS

| | | |
|---|---|---|
| 824,514 | 10/1969 | Alm . |
| 1,225,374 | 8/1987 | Rogers . |
| 1,230,866 | 12/1987 | Pask . |
| 2,686,384 | 8/1954 | Lemmond .......................... 239/168 |
| 3,395,503 | 8/1968 | Greenburg et al. ................ 239/166 |
| 4,213,565 | 7/1980 | Jackson .............................. 239/167 |
| 4,739,930 | 4/1988 | Pask .................................... 239/161 |

FOREIGN PATENT DOCUMENTS

| | | |
|---|---|---|
| 1258835 | 8/1989 | Canada ............................... 239/168 |
| 832219 | 2/1952 | Fed. Rep. of Germany ...... 239/168 |
| 572556 | 10/1945 | United Kingdom ............... 239/168 |

Primary Examiner—Andres Kashnikow
Assistant Examiner—Karen B. Merritt
Attorney, Agent, or Firm—St. Onge, Steward, Johnston & Reens

[57] ABSTRACT

The invention herein discloses an improved and unique new sprayer implement for spraying crops. The sprayer comprises two wing booms, a left and a right which are controlled independently from one another by hydraulic cylinders. The sprayer is capable of maintaining one wing boom in the transport position while the other main wing boom is extended transversely to the direction of travel in the operating position therefore allowing the operator to spray with one side of the sprayer only. This allows the operator to have access to areas of a field where he would not normally be able to work with a wide sprayer. The sprayer is also equipped with an anti-damage locking system whereby a resilient spring or shear pin is released when either one of the main wing booms strikes an obstacle such as a tree or power pole.

4 Claims, 20 Drawing Sheets

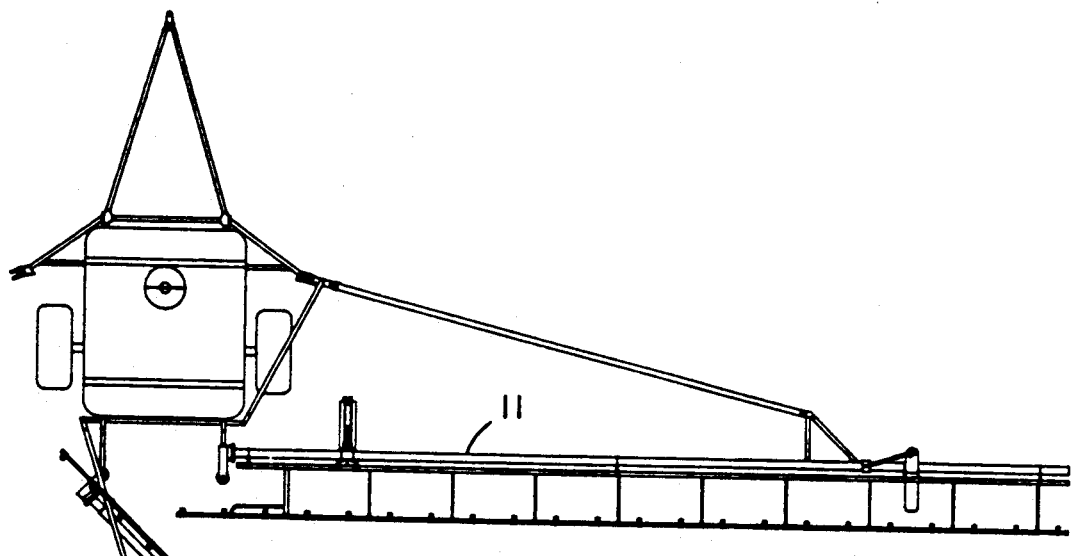
FIG. 8
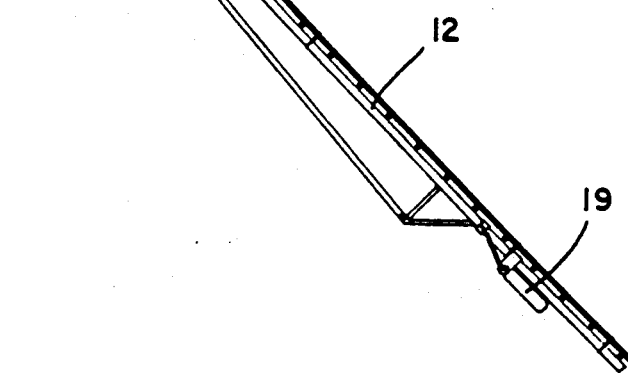

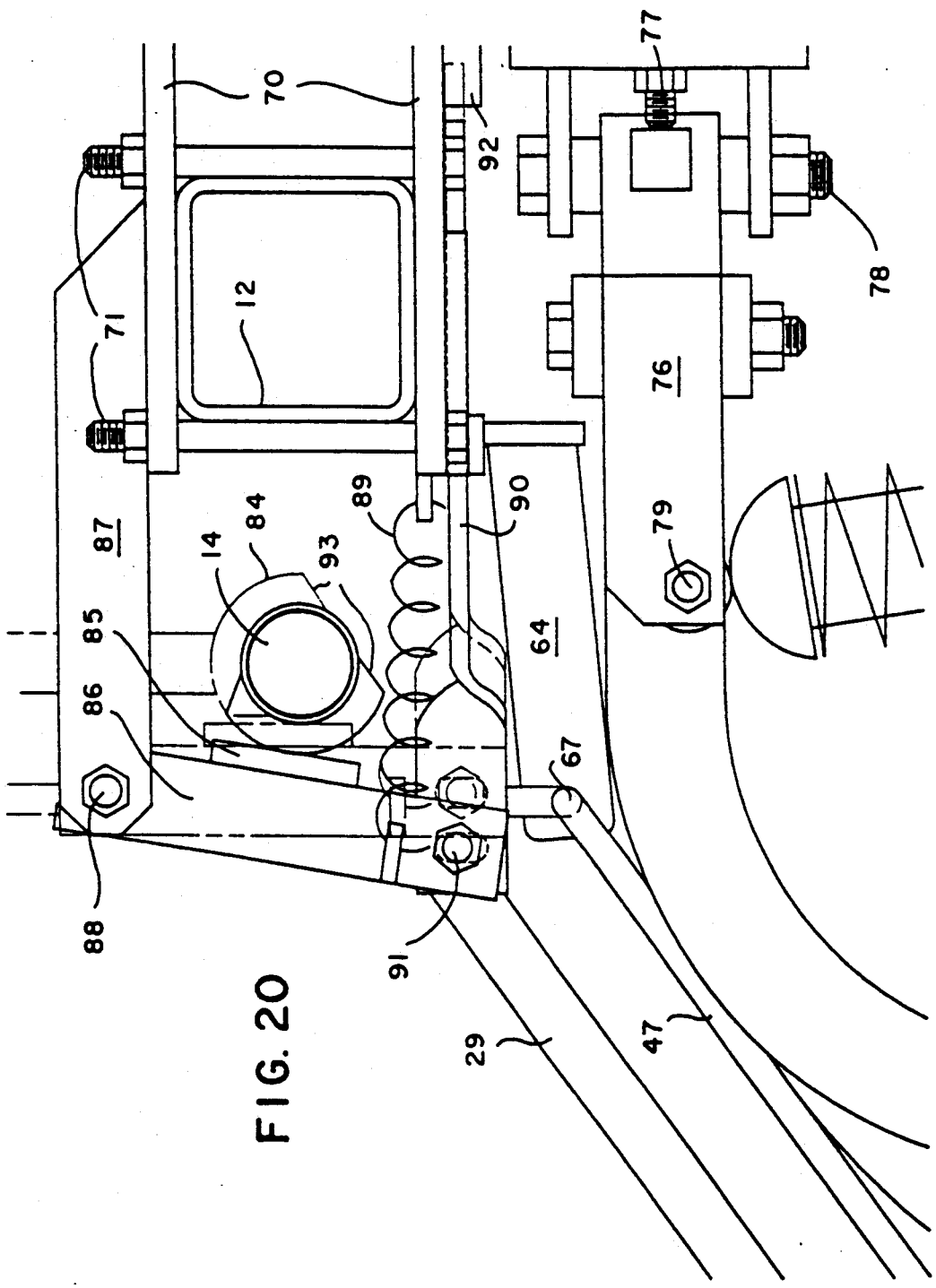

5,029,757

AUTO-FOLD SPRAYER

FIELD OF THE INVENTION

This invention relates to farm implements and particularly relates to folding field sprayers which operate with extended booms in the spraying position and then rearwardly fold the booms in the transport position.

BACKGROUND OF THE INVENTION

As farming becomes more capital intensive and less labor intensive farm implements such as sprayers have increased in size. In order that such sprayers have a wide operating spray, where the wings are extended outwardly transverse to the direction of travel, it has become necessary to fold the wings either forwardly, upwardly or rearwardly to transport the implements along roadways. Sprayers and other farm implements with this folding ability are well-known in the art.

One of the difficulties however presently facing the farmer is that the width of the sprayer when in the operating position has greatly increased in size, sometimes as wide as one hundred feet or more. No problems are encountered in wide open spaces such as large treeless fields in the prairies, but difficulties do arise when the farmer wishes to spray a smaller area such as between a fence and a tree or power pole or rock pile.

Another problem which is encountered in the present sprayers is that when the sprayer is moving across the field in the operating position, one of the booms can strike an immovable object thereby causing damage to the wings or connecting mechanisms between the wings and the frame.

Generally, modern sprayers are comprised of a central boom and a left and right wing boom, or a plurality of left and right wing booms attached to the central boom. This arrangement was deemed necessary in order that the complete width of the path of the sprayer implement was covered with the requisite herbicide or pesticide chemical.

Another problem occurs when sprayers of extreme width of a hundred or more feet are moved across uneven land. In particular those sprayers whose wings are supported by wheels put undue stress on the wings and spray booms due to the uneven surface of the ground.

It is an object of the present invention to provide a sprayer wherein one wing boom can operate independently of a second wing boom. That is to say one wing boom can be spraying in the transverse operating position while the other wing boom is idle in the transport position.

It is a further object of the present invention to provide a locking means which is released if the sprayer strikes a solid object.

It is a further object of the present invention to provide a sprayer which quickly and easily moves from the transport position to the operating position without the driver leaving the power source to make manual adjustments.

It is a further object of the present invention to provide a sprayer having no central boom, while maintaining a spray pattern evenly across the entire width of the implement.

SUMMARY OF THE INVENTION

Therefore this invention seeks to provide a field sprayer implement adapted to be towed by a power source comprising:

a frame supported by wheels and adapted to hold a tank;

a left and right main wing boom pivotally attached to the rear of said frame, said main wing booms detachably connected to the front of said frame by wing hitches; each of said booms being supported by an inboard and an outboard caster wheel; one of said outboard or said inboard wheels adapted to be locked in a transport position;

a left and right dry spray boom mounted to said main wing boom for rotation from a transport to operating position; said main wing booms and said dry spray booms including joints to permit pivotal movement of said booms over uneven ground;

a plurality of wet spray booms equipped with nozzles and adapted to apply spray liquid over the entire width of the implement when in the operating position; said wet spray booms fixedly mounted to said dry spray booms for pivotal movement from a lower rearward operating position to a substantially vertical upwards transport position;

spray actuating means located at the power source for independently actuating the flow of herbicide or pesticide to the left and right wet spray booms;

wherein, in operation, right and left main wing boom hydraulic cylinders are independently actuated by actuating means located within the cab of the power source to simultaneously raise said wet spray booms, release said wing hitches from said frame and lock one of said outboard or said inboard caster wheels when said implement is in the transport position, and conversely said hydraulic cylinders lower said spray booms and unlock said caster wheels when said implement is moved to the operating position; thus said sprayer implement is capable of spraying with one main wing boom only in the transverse operating position, while the other is in the transport position thereby permitting the operator to avoid obstacles and spray in areas not accessible when both wing booms are in the transverse operating position.

The sprayer of the present invention is equipped with a frame with a tank mounted thereon and right and left main wing boom extending from the rear portions of the frame. The frame is supported by wheels and is equipped with a hitch which is used to attach to a power source. Extending from each of the left and right main wing booms is a wing hitch which is adapted to lock into a wing hitch bracket one of each of which extend from the right and left sides of the frame. Each of the wing booms is supported by an inboard caster wheel and an outboard caster wheel either of which is lockable in the transport position. Extending rearwardly from the left and right main wing booms are left and right dry spray booms respectively. A hydraulic cylinder is located on each of the left and right main wing booms. These cylinders are adapted to rotate the dry spray booms from an operating to a transport position and vice versa when the operator in the cab of the power source actuates the hydraulic system. Extending rearwardly and fixedly attached to the dry spray booms are a plurality of wet spray booms.

In a preferred embodiment there are two wet spray booms on each side of the implement. When the pistons of the hydraulic cylinders are extended, the wet spray booms are raised from a rearwardly extending operating position to an upwardly extending transport position. The wet spray booms extend further inwardly than the main wing and dry spray booms so that a continuous and even spray is emitted throughout the width of the path of the implement when the operator in the cab activates the spray flow actuating means. The wing hitches, wing trusses, main wing booms and dry spray booms are equipped with joints either universal or horizontal in order to avoid any damage due to uneven ground. The inboard and outboard wet spray booms are joined with a flexible hose to allow the same type of flex.

Commencing in the operating position, with the two main wing booms extending transversely to the direction of travel, the wing hitches are connected to the frame by a locking mechanism on the end of the wing hitch brackets. When the operator wishes to put one or both main wing booms in the transport position, he simply activates one or both of the hydraulic cylinders by moving the hydraulic actuating means within the cab thereby rotating the dry spray booms which in turn raise the wet spray booms. Each dry spray boom is connected to a wing hitch locking device at the front of the frame by means of a cable. When the wet spray booms are raised upwardly, the cable activates the latch which is released from the locking plate. Similarly, the rotation of the dry spray boom turns a cam mechanism which allows either the outboard or inboard caster wheels to move into and be locked in the transport position. Once the wing hitches are detached, the operator simply moves forward and the main wing booms move rearwardly into the transport position.

If the operator wishes to use only the right side of the sprayer for spraying, the left hydraulic cylinder is activated from the power source permitting the left wing boom only to rotate the spray booms into the transport position, and then unlock the left wing hitch, thereby allowing the left side to move rearwardly as the implement moves forwardly. This is particularly useful if the operator wishes to move into a smaller width of the field such as between a stone pile and a fence or near a gate or between power poles.

As previously mentioned, the locking mechanisms are equipped with resilient springs or shear pins. If at any time the wing booms strike by accident an obstacle in the field, the locking mechanism is released thereby avoiding any damage to the implement.

BRIEF DESCRIPTION OF THE DRAWINGS

The invention will be more fully described in conjunction with the following drawings wherein

FIG. 8 is a partial top view of one boom in full operating position and the second boom in transport position during a right turn of the machine;

FIG. 20 is a close-up view of FIG. 19;

DETAILED DESCRIPTION OF THE DRAWINGS

Figure 1:
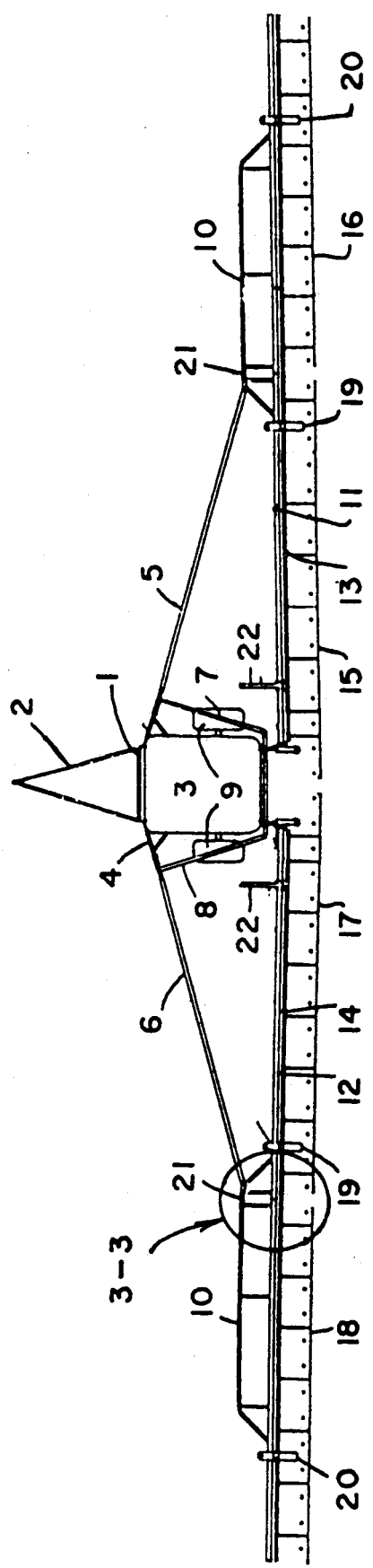
FIG. 1 is a top view of the sprayer in operating position.

In FIG. 1 the sprayer which is the subject of the invention is in the operating position. The sprayer has a frame (1) which is coupled to a power source such as a tractor by a hitch (2). Supported on top of the frame (1) is located a tank (3) used to hold spray chemicals. At the front of the frame and extending laterally on each side thereof are wing hitch brackets (4). Coupled to the wing hitch brackets on the right side of the frame and removable therefrom is a wing hitch (5). Attached to the wing hitch (5) and connected to a bracket on the rear of the frame is the wing hitch support arm (7). Similarly, on the left side of the sprayer, a wing hitch (6) is detachably connected to the left wing hitch bracket (4). A wing hitch support arm (8) attaches to the wing hitch (6) at one end and pivotally attaches to a bracket on the rear portion of the frame at its opposite end. The frame and tank are supported by load bearing wheels (9).

At their remote ends, wing hitches (5) and (6) are connected to the wing trusses (10). The wing trusses are connected to the right main wing boom (11) and the left main wing boom (12). Mounted to the right main wing boom (11) for pivotal movement is the right dry spray boom (13). Similarly, supported by the left main wing boom (12) is the left dry spray boom (14). Extending outwardly from the right dry spray boom (13) are the right wet inboard spray boom (15) and the right wet outboard spray boom (16). Similarly, on the left side of the sprayer there is a left wet inboard spray boom (17) and a left wet outboard spray boom (18). The inboard and outboard wet spray booms are connected with a flexible hose (not shown in FIG. 1).

Each of the right main wing boom and left main wing boom are supported by caster wheels (19) and (20). One of caster wheels 19 and 20 is a lockable caster wheel and the other is free wheeling. It is necessary to have one caster wheel locked when the wing boom is in the transport position. The main wing booms and dry spray booms on both the left side and right side of the implement are equipped with pivotal joints (to be discussed in detail in connection with the other Figures). A hydraulic cylinder assembly (22) is located on each main wing boom (11) and (12). These rotate the dry and wet booms (13), (14), (15), (16), (17) and (18).

Figure 2:
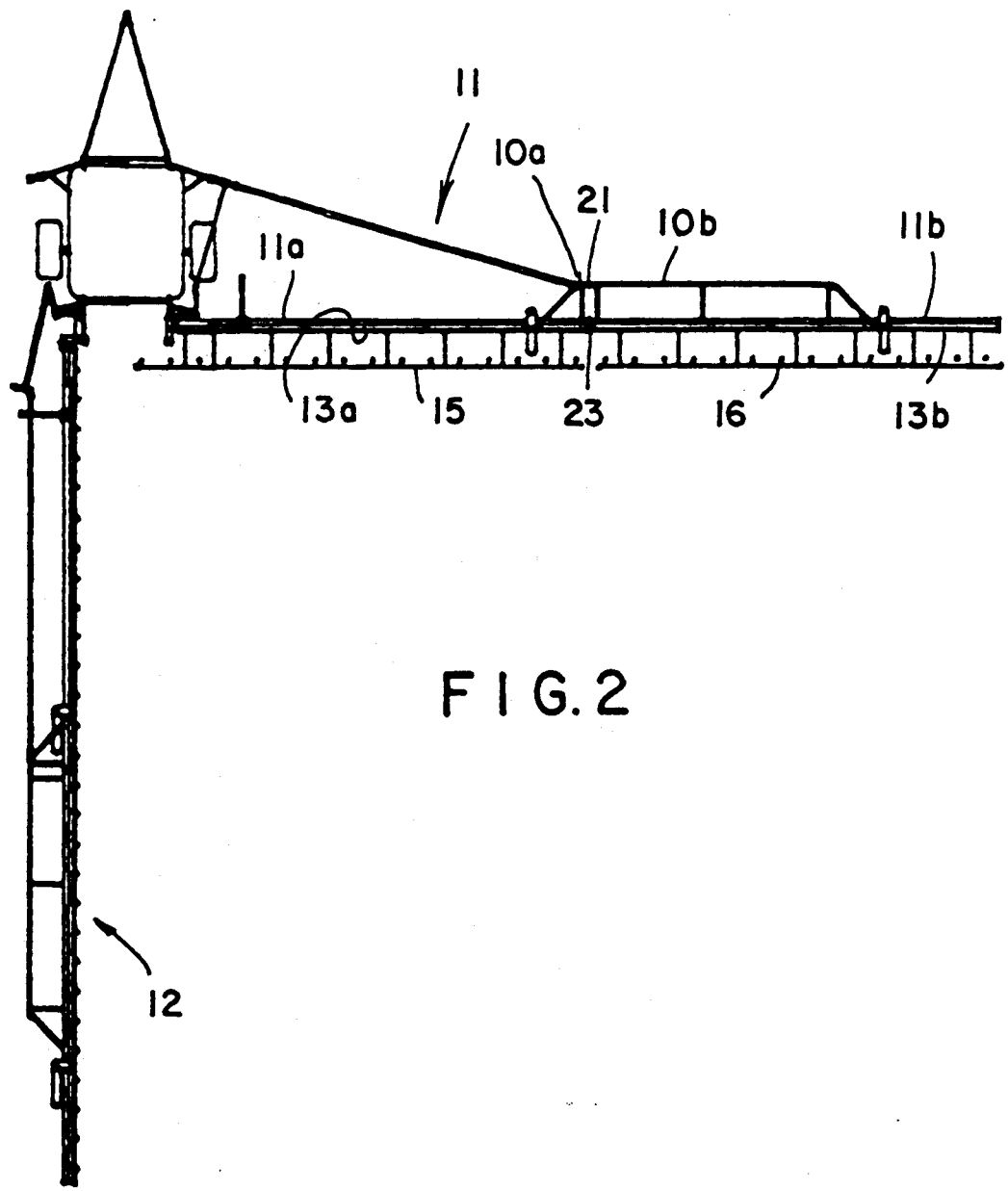
FIG. 2 is a top view of the sprayer with one boom in operating position and a second boom in transport position.

In FIG. 2 the right main wing boom (11) is shown in the operating position. Vertical pivot joint (23) separates the right main wing boom (11) into an inboard main wing boom (11a) and an outboard main wing boom (11b). In the operating position the right inboard wet boom (15) and right outboard wet boom (16) extend rearwardly of the right main wing boom (11). The wing truss (10) is also divided into an inboard wing truss (10a) and an outboard wing truss (10b) by a vertical joint (21). Finally, the right dry spray boom (13) is also divided into an inboard spray boom (13a) and an outboard spray boom (13b). One notes in FIG. 2 that when the left main wing boom (12) is in the transport position the left wet spray boom is in a vertically upwards position.

Figure 3:
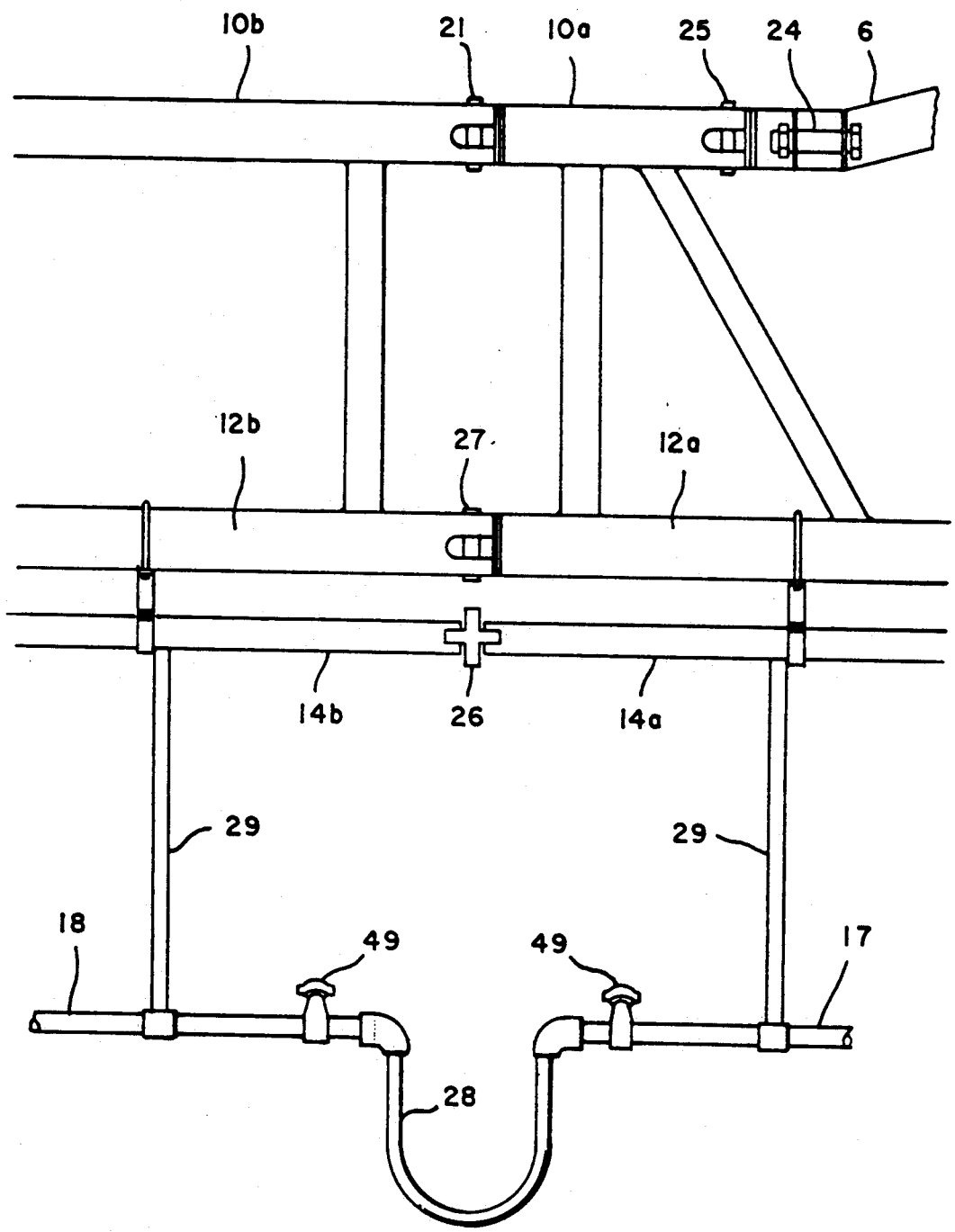
FIG. 3 is a close-up top view of area 3—3 shown in FIG. 1.

FIG. 3 is an enlarged top view of the area 3—3. The left wing hitch (6) is connected to the inboard wing truss (10a) by means of two joints (24) and (25). Joint (25) consists of a horizontal pin for vertical pivotal movement. Joint (24) consists of a longitudinally aligned screw or bolt for twisting movement. The inboard wing truss (10a) is pivotally connected to the outer wing truss (10b) by means of a horizontal pin (21) for vertical pivotal movement. Inboard left main wing boom section (12a) is pivotally connected to outboard left main wing boom section (12b) by means of a horizontal pin (27). Inboard dry spray boom (14a) is pivotally connected with outboard dry spray boom (14b) by means of an universal joint (26). The connections between left main wing boom sections (12a) and (12b) and dry boom sections (14a) and (14b) will be explained in other Figures.

Wet spray boom inboard section (17) and outboard section (18) are connected to the dry spray boom sections (14a) and (14b) by means of the wet fixed boom bracket arms (29). Inboard wet spray boom section (17) is connected to outboard wet boom section (18) by means of a flexible hose (28).

Figure 4:
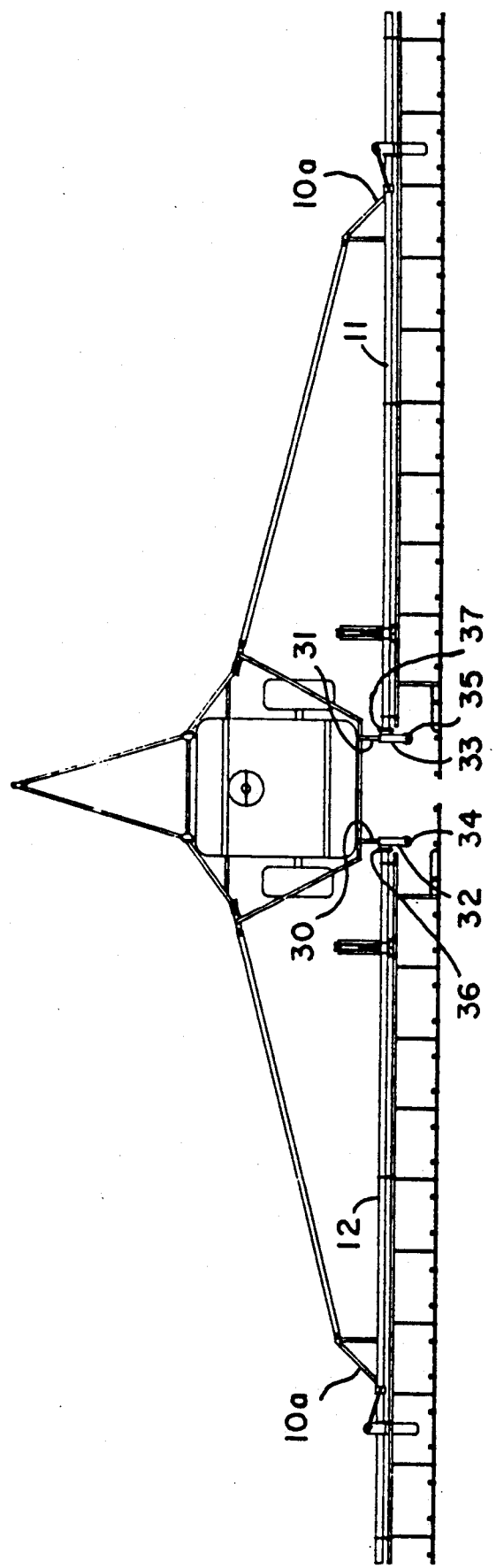
FIG. 4 is a partial top view of the sprayer in operating position.

FIG. 4 is a top view of an alternative embodiment of the invention wherein the wing trusses (10) are composed of only a right inboard wing truss (10a) and a left inboard wing truss (10a). One notes in closer detail the connection of the right main wing boom (11) and a left main wing boom (12) to the frame (1). The left boom to frame right angle bracket (32) is pivotally connected to the left rear extension of the main frame (30) by means of a vertical pin (34) which allows the left main wing boom (12) to pivot horizontally. Between the left boom to frame right angle bracket (32) and the left main wing boom (12) is located a horizontal pin connection (36) which allows for vertical pivoting.

Similarly, the right rear extension of the main frame (31) is pivotally connected to the right boom to frame right angle bracket (33) by means of a vertical pin (35) which allows for horizontal pivotal movement of the right main wing boom.

The right boom to frame right angle bracket (33) is pivotally connected to the right main wing boom (11) by means of a horizontal pin (37) which allows for vertical pivotal movement of the right main wing boom.

Figure 5:
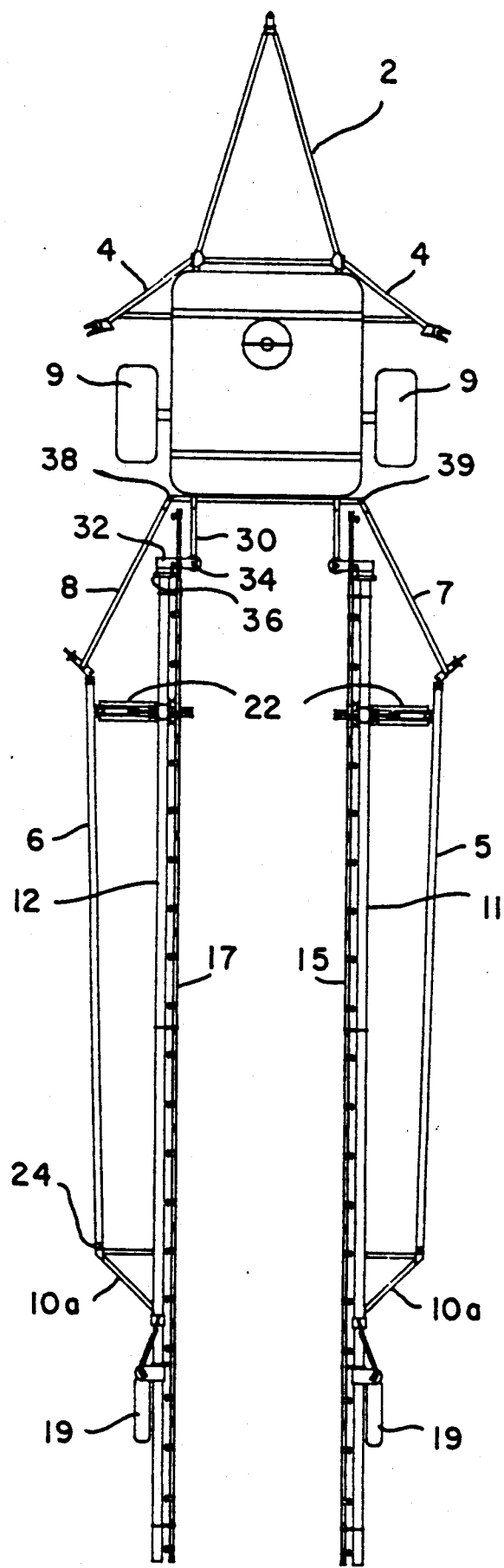
FIG. 5 is a partial top view of the sprayer in full transport position.

In FIG. 5, one sees the embodiment of FIG. 4 wherein the left and right main wing booms (12) and (11) respectively are in the transport position, i.e., folded rearwardly behind the frame (1). One notes also that the inboard caster wheels (19) are turned forwardly in the direction of the implement. As well the wet spray booms (15) and (17) have been raised to be vertically upwards of the right and left main wing booms (11) and (12) respectively. One notes also that the right wing hitch (5) and the left wing hitch (6) are in the uncoupled position with the right wing hitch support arm (7) and the left wing hitch support arm (8) extending rearwardly from the frame, pivoting about the frame by vertical pins (38) and (39).

Figure 6:
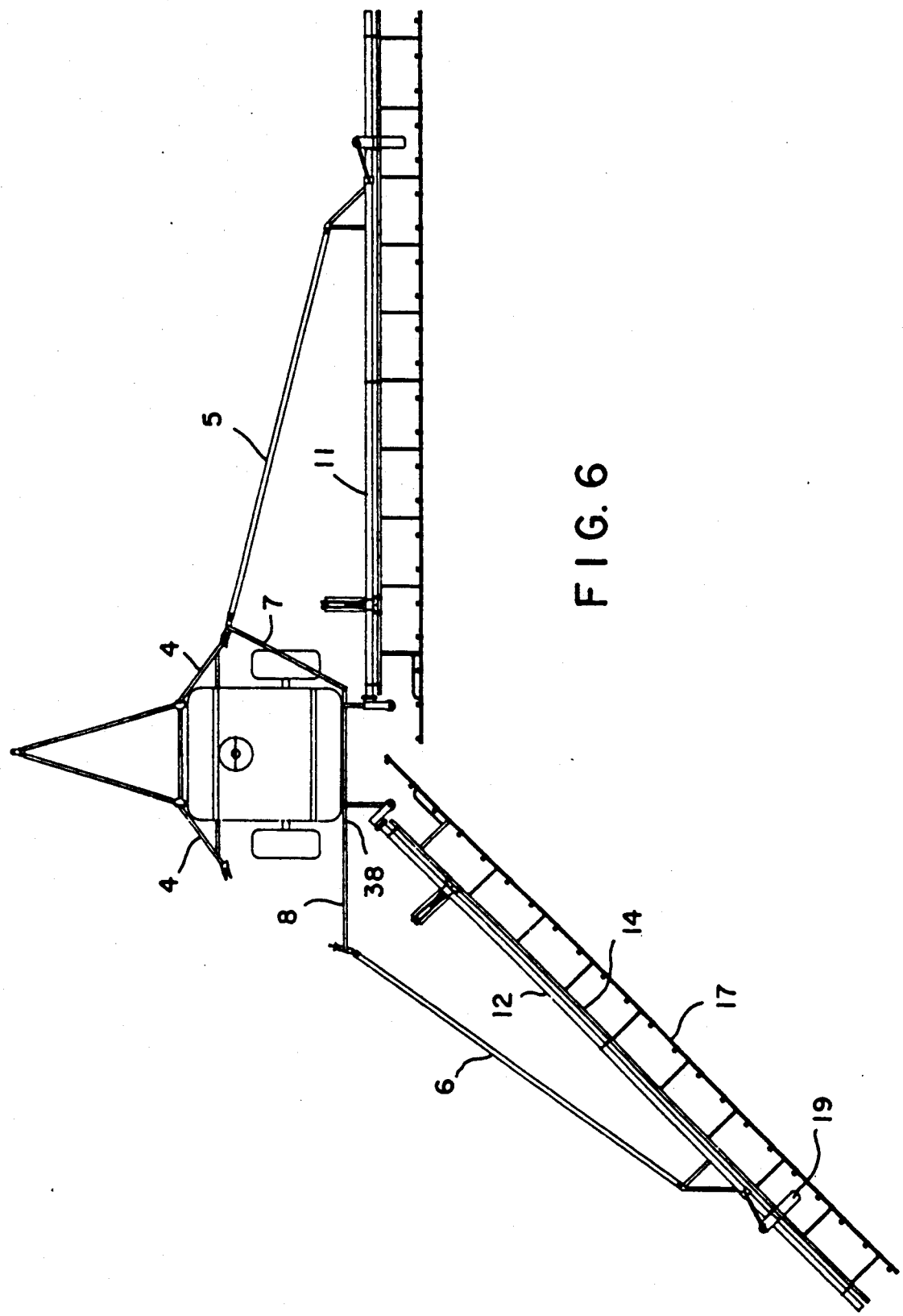
FIG. 6 is a partial top view of the sprayer with one boom in operating position and the second boom in partially collapsed transport position.

In FIG. 6, the right main wing boom (11) is in the operating spraying position whereas the left main wing boom (12) is extending slightly rearwardly as the wing hitch (6) and the wing hitch support arm (8) become detached from the wing hitch bracket (4).

The wing hitch support arm (8) pivots on the rear of the frame on pivot pin (38). One notes that the inboard caster wheel (19) on the left boom has slightly turned towards the transport position at this point. One also notes the left dry spray boom (14) and the left wet spray boom (17) are in the rearwardly extending position.

Figure 7:
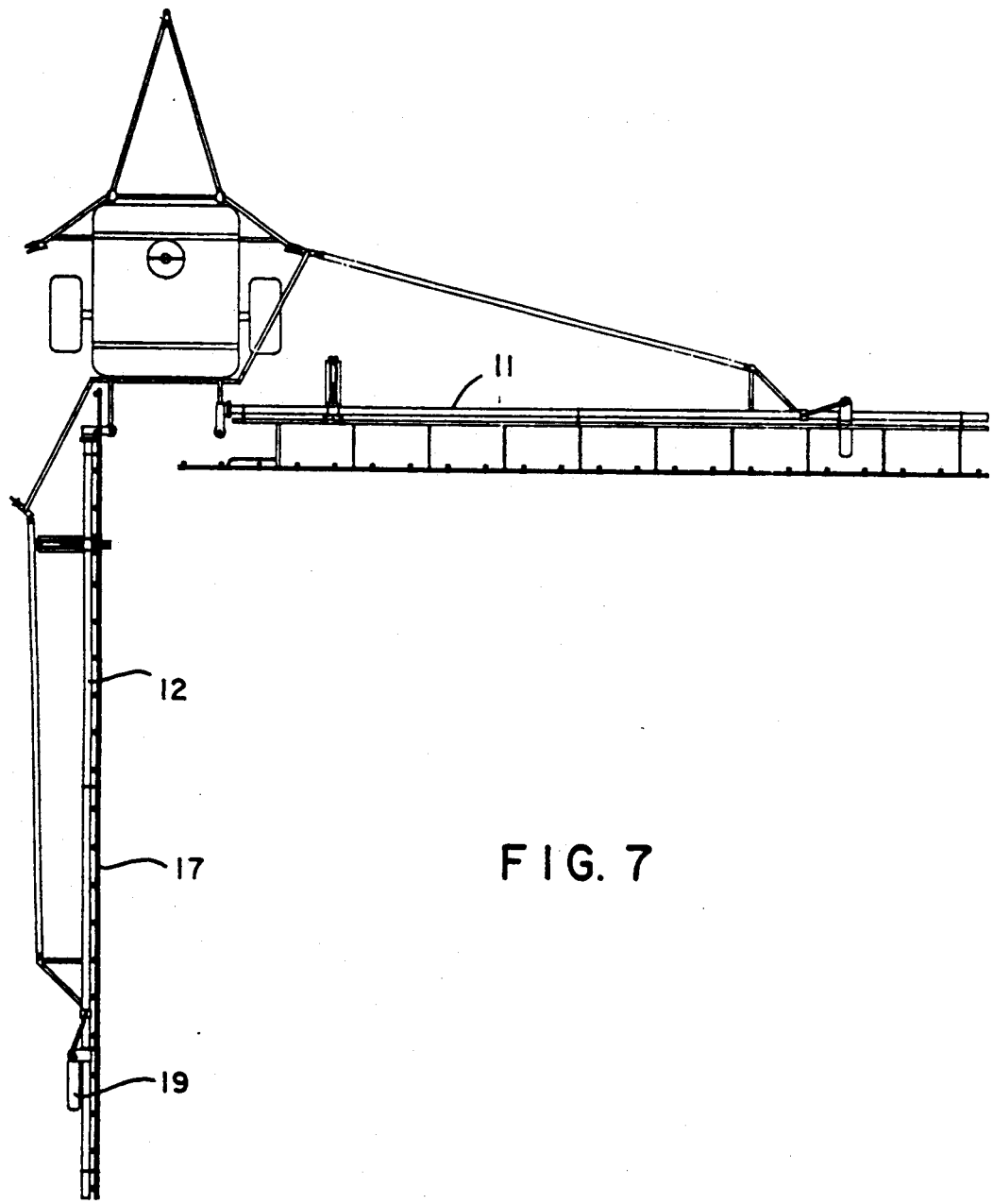
FIG. 7 is a partial top view of the sprayer with one boom in fully transport position and the second boom in operating position.

In FIG. 7, the left main wing boom (12) is in the full transport position. The left wet inboard spray boom (17) is in the vertical position and the inboard caster wheel (19) is in the transport position.

Thus in FIG. 7 one notes that the operator, by keeping the right main wing boom (11) in the operating position and the left main wing boom (12) in the transport position by means of the hydraulic actuating means can spray a portion of the field using the right main wing boom while having the left main wing boom (12) in the transport position. This is particularly advantageous when spraying fences or roads or where there are power poles or other obstructions on the left side.

In FIG. 8, the machine is shown with the right main wing boom (11) in operating position and the left main wing boom (12) in a transport position as the implement undergoes a right turn. One notes that the right main wing boom (11) is kept completely transverse to the direction of travel while the left main wing boom (12) trails inwardly on the turn.

Figure 9:
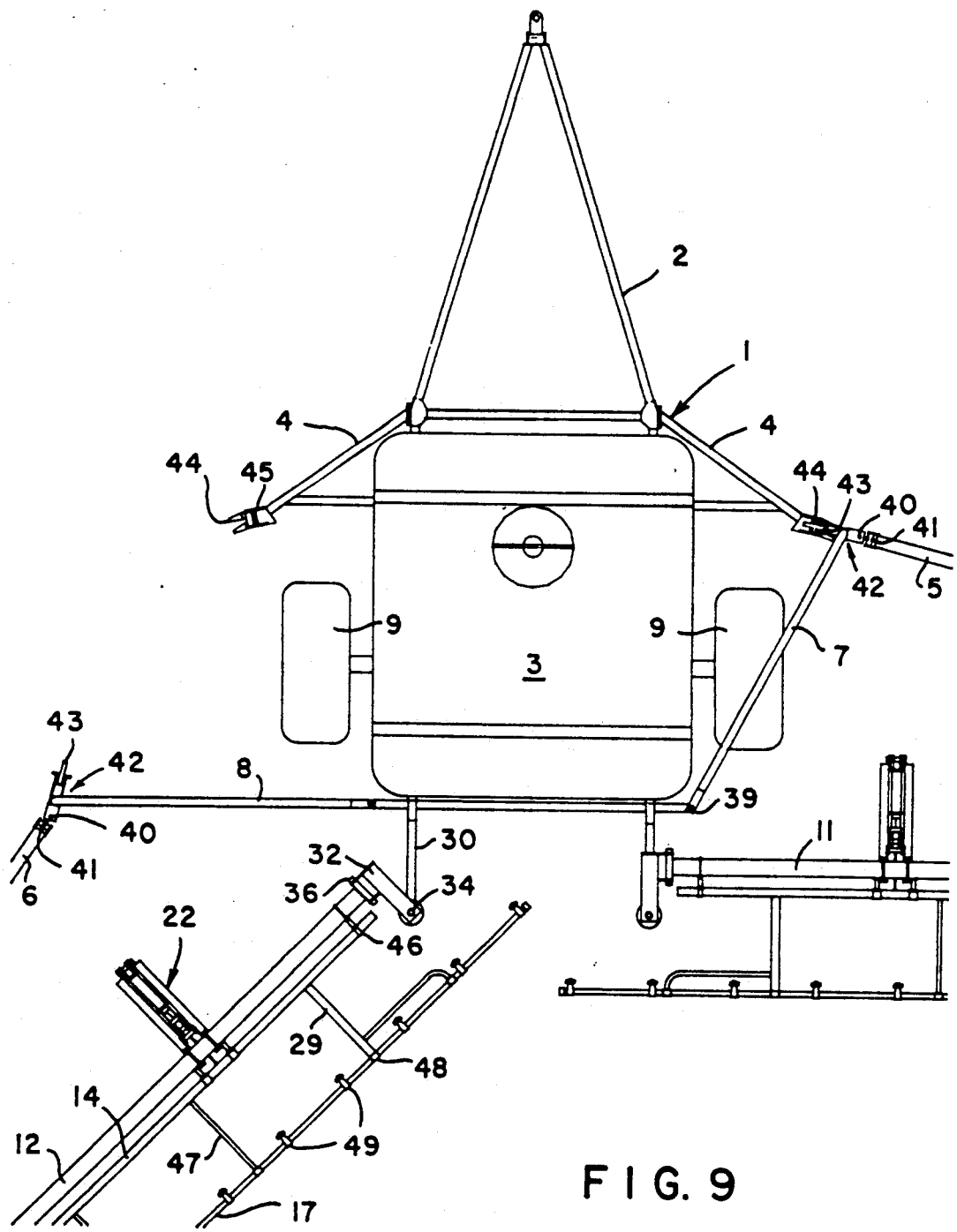
FIG. 9 is an enlarged view of FIG. 6.

FIG. 9 is an enlarged top view of the frame (1) wherein the right main wing boom (11) is in the operating position and the left main wing boom (12) is in a partial transport position. On the end of left wing hitch support arm (8) and right wing hitch support arm (7) are obliquely welded fixed joint brackets (42). At one end of the bracket is the lock (43) which is adapted to be secured to the wing hitch support bracket (4) by means of guides (44) and locking plate (45). At the opposite end of the fixed joint bracket (42) is a vertical pin for horizontal movement (40) and a horizontal pin for vertical pivoting movement (41). This acts as a universal joint between the wing hitch (6) and the fixed joint bracket (42).

The wet fixed boom bracket arms (29) are fixedly attached to the dry spray boom (14). At the opposite end there is a pivot for vertical movement (48) located on the wet spray boom (17). Nozzles (49) are located along the wet spray boom and the pivoted spray angle rods (47) maintain the spray nozzles at a constant angle from the ground facing forwardly at all times. The precise nature of the pivoted spray angle rods (47) is shown in more detail in subsequent drawings.

Figure 10:
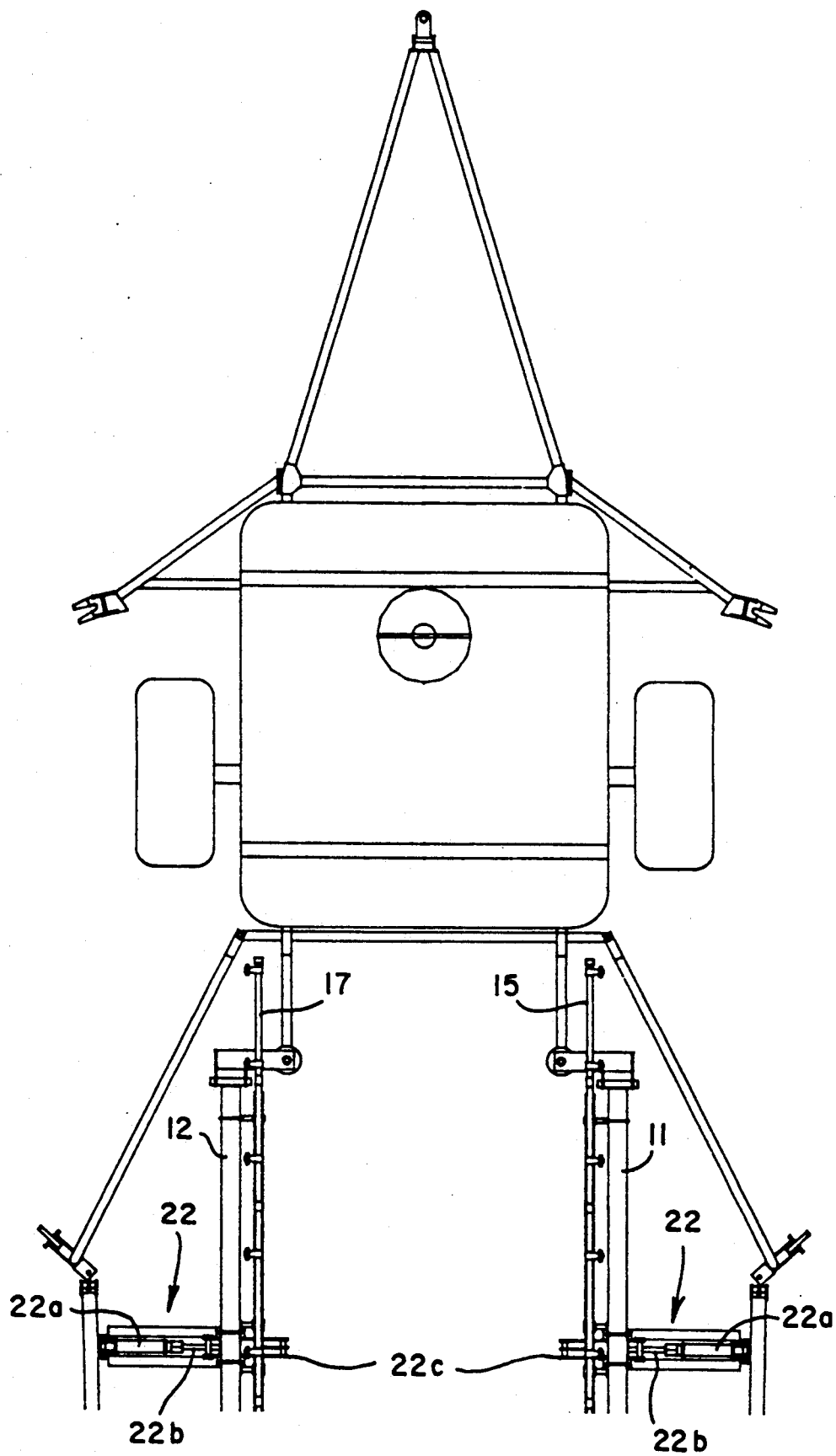
FIG. 10 is an enlarged view of FIG. 5.

In FIG. 10, both the left main boom (12) and the right main boom (11) are in full transport position. The hydraulic cylinder and mount assembly (22) is more clearly seen in this drawing showing the cylinder (22a) piston (22b) and the linkage (22c). In a subsequent drawing, a close-up view of the area of the cylinder and mount assembly (22) is shown in greater detail.

Also in FIG. 10 one notes that when the pistons (22b) are extended from cylinders (22a) the wet booms (17) and (15) are in vertically upright transport position.

Figure 11:
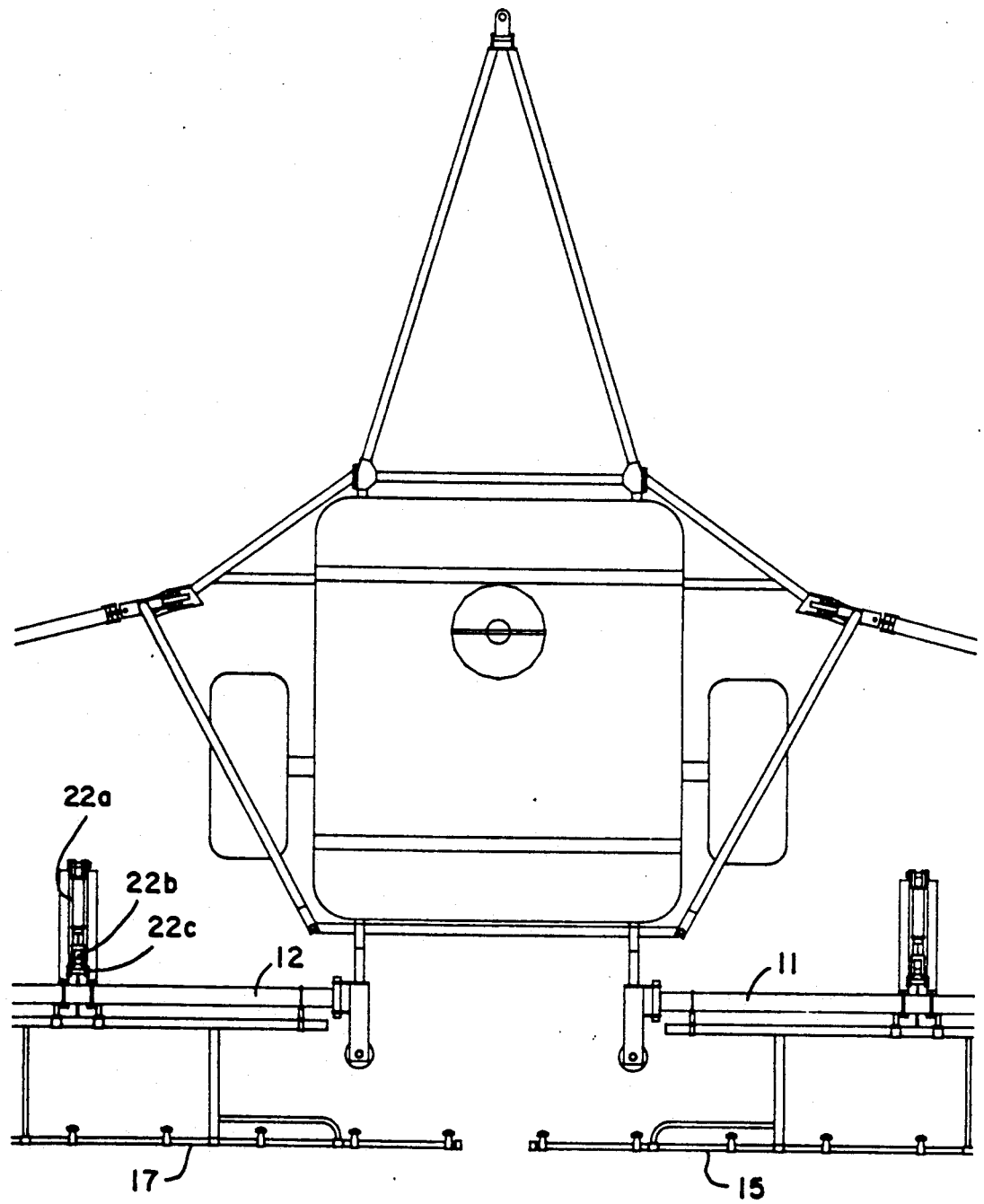
FIG. 11 is an enlarged view of FIG. 4.

In FIG. 11 both the left main wing boom (12) and the right main wing boom (11) are in the operating position with the inboard wet spray booms (17) and (15) extending rearwardly. The pistons of the cylinders (22b) are fully retracted.

Figure 12:
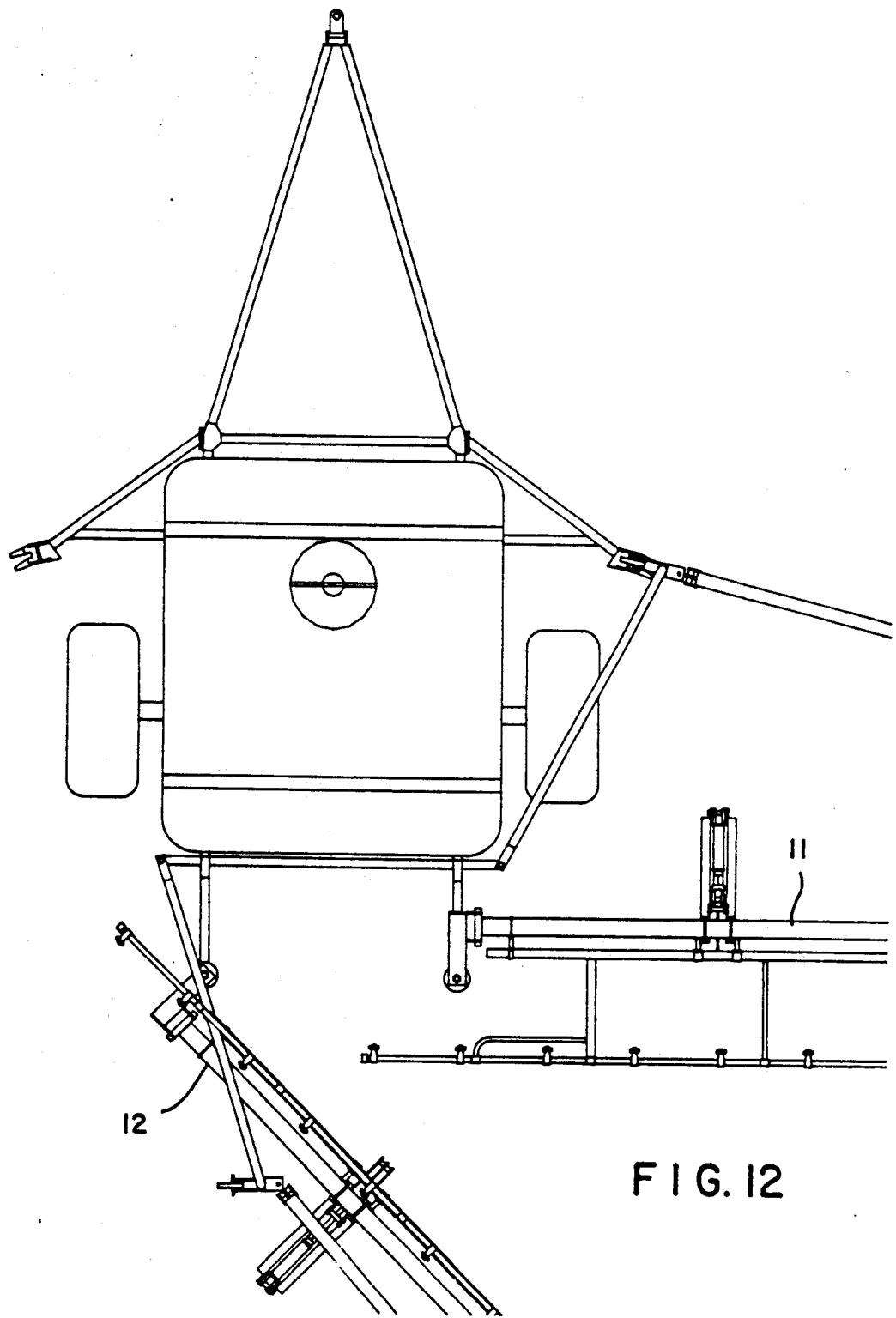
FIG. 12 is an enlarged view of FIG. 8.

In FIG. 12 the right main wing boom (11) is in the operating position and the left main wing boom (12) is in a transport position such as when the implement is being turned to the right.

Figure 13:
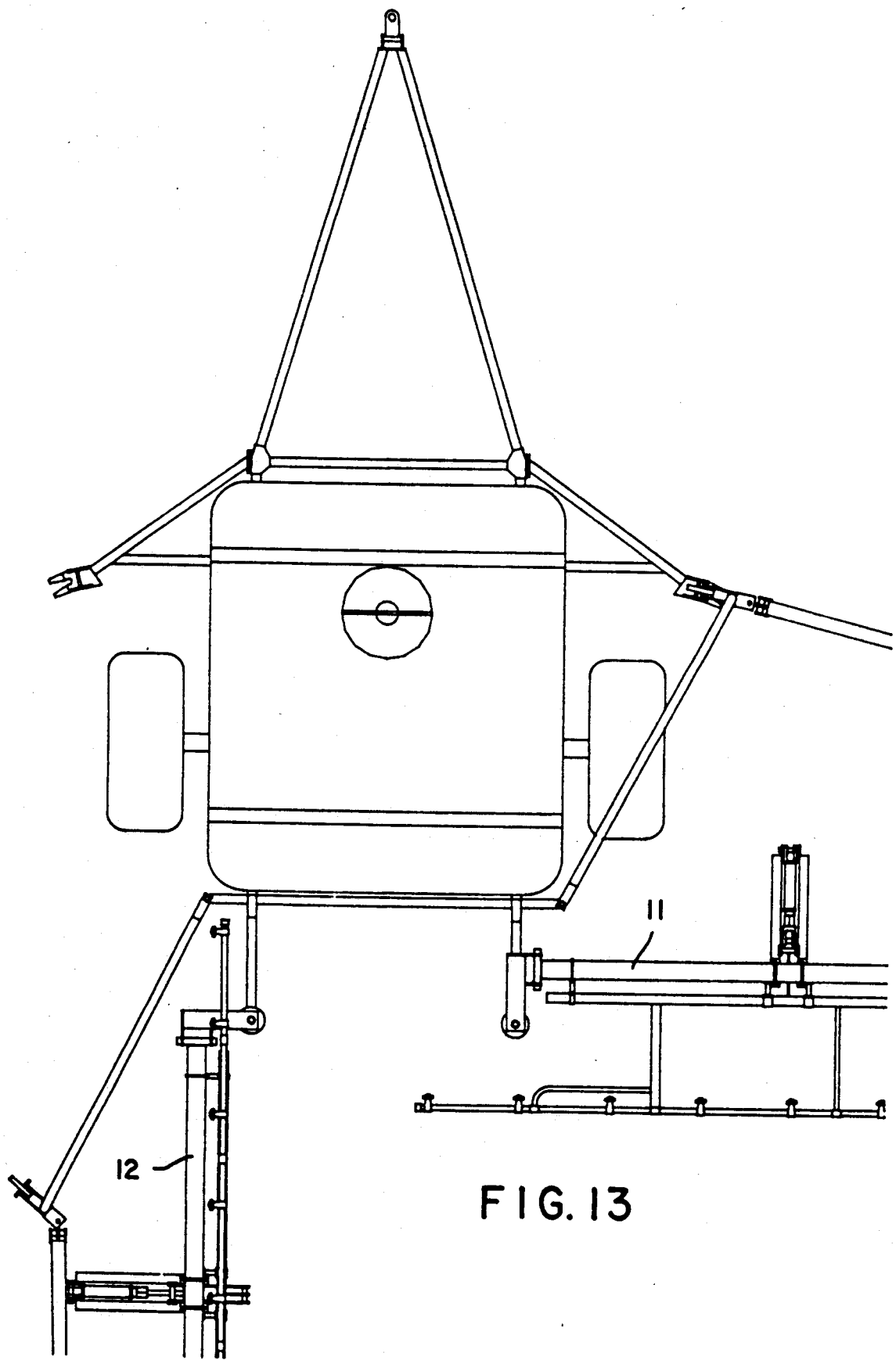
FIG. 13 is an enlarged view of FIG. 7.

In FIG. 13 the right main wing boom (11) is in the operating position and the left main wing boom (12) is in the transport position.

Figure 14:
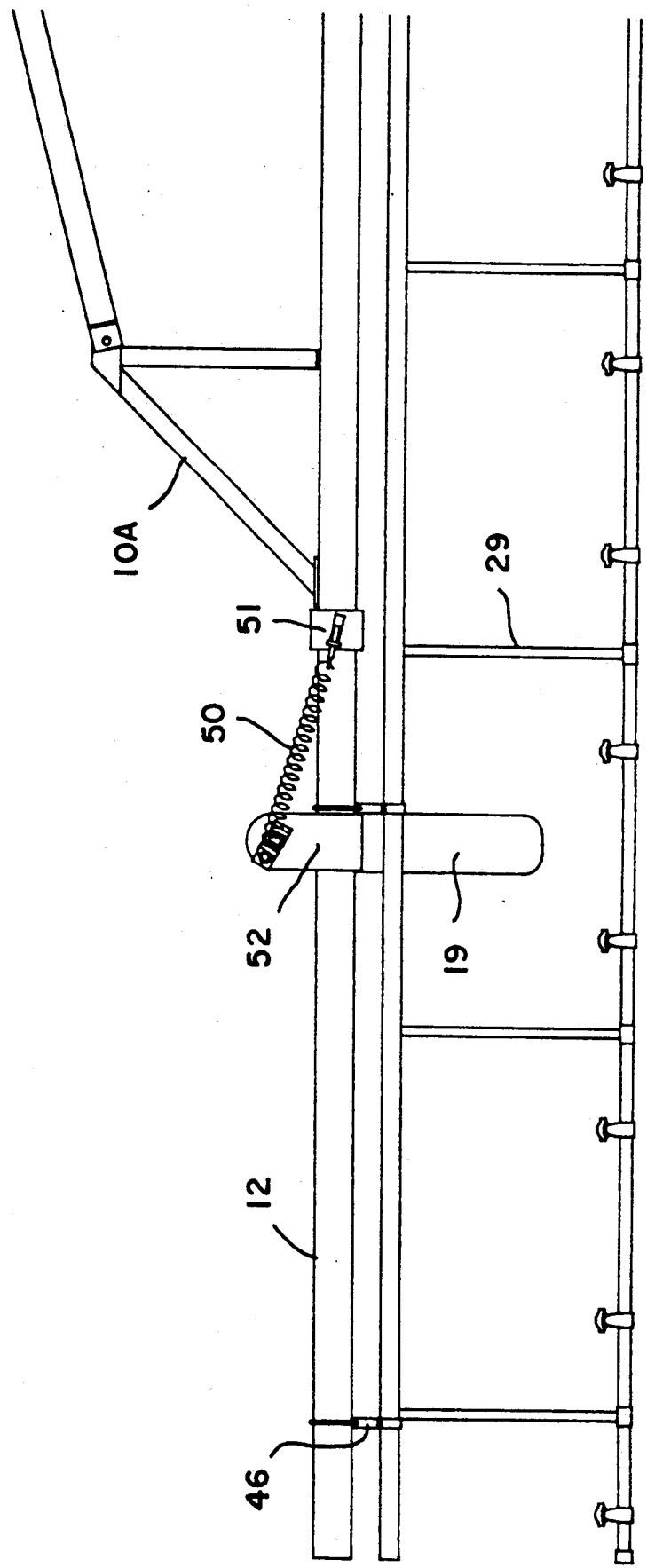
FIG. 14 is a top view of the inboard caster wheel in operating position.

FIG. 14 is a close-up view of an inboard caster wheel (19) shown when the left main wing boom (12) is in the operating position. Caster wheel (19) is facing in the direction of travel of the implement. A spring (50) coupled to the caster wheel at bracket (52) and to the left main wing boom (12) at bracket (51) aids the caster wheel to move from the operating position to the transport position.

Figure 15:
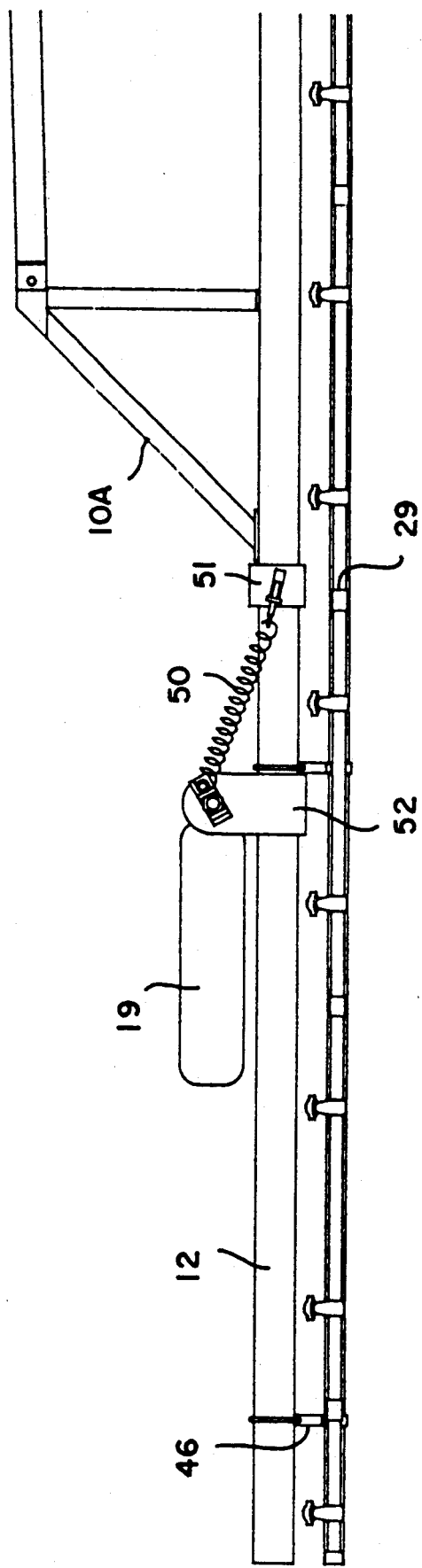
FIG. 15 is an enlarged top view of the inboard caster wheel in transport position.

In FIG. 15, the caster wheel (19) is in the transport position and the spring (50) is in a retracted position.

Figure 16:
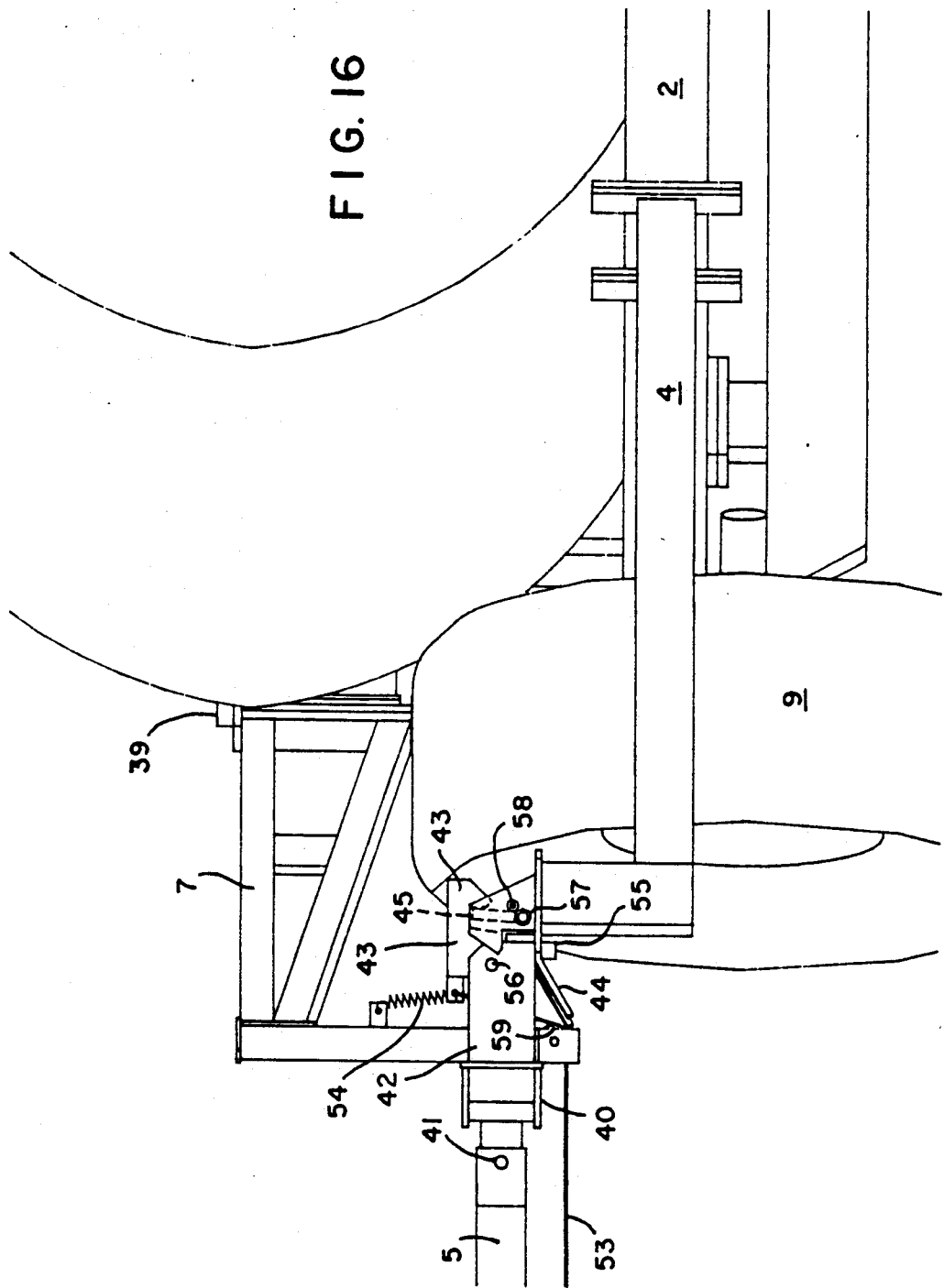
FIG. 16 is an enlarged front view of the wing hitch coupled to the frame in operating position.

In FIG. 16, one sees a close-up view of the front right side of the implement. The right wing hitch support arm (7) is coupled to the fixed joint bracket (42). The right wing hitch (5) is locked in place on the right wing hitch bracket (4). The wing hitch latch (43) is kept in the locked position by tension spring (54). Wing hitch latch (43) engages locking plate (45) which pivots on locking plate pivot (57). A shear pin (58) can be broken by excessive force on locking plate (45) such as when the right main wing boom (11) hits an obstacle such as a telephone pole. This allows wing hitch latch (43) to pull locking plate (45) outwardly. In normal operation however, wing hitch catch (43) pivots about wing hitch catch pivot pin (56) and is raised from locking plate (45) by means of cable (53) which goes around pulley guide (59) and attaches to the wing hitch latch (43). Cable (53) is connected to the dry right spray boom (13) which is rotated by hydraulic linkage system (22). Wing hitch guide (55) goes between locking guides (44) to enable a smooth interlocking between wing hitch (5) and wing hitch bracket (4).

Figure 17:
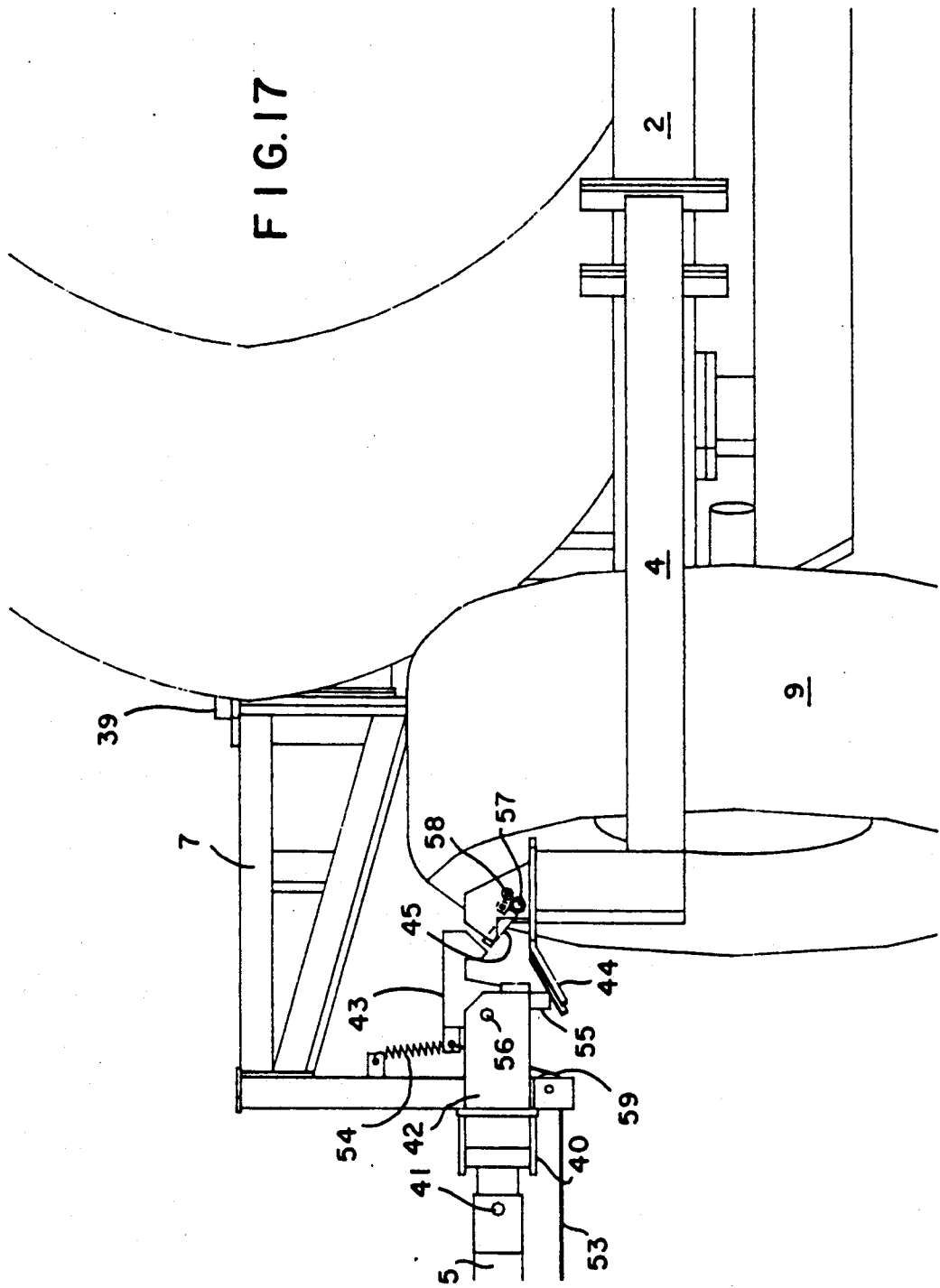
FIG. 17 is the same view as FIG. 16 with the wing hitch unlocked from the frame.

In FIG. 17, one views the front right portion of the invention whereby the shear pin, which secures the wing hitch latch (43) to the locking plate (45), has broken allowing the wing hitch (5) to pull away from the wing hitch bracket (4).

Figure 18:
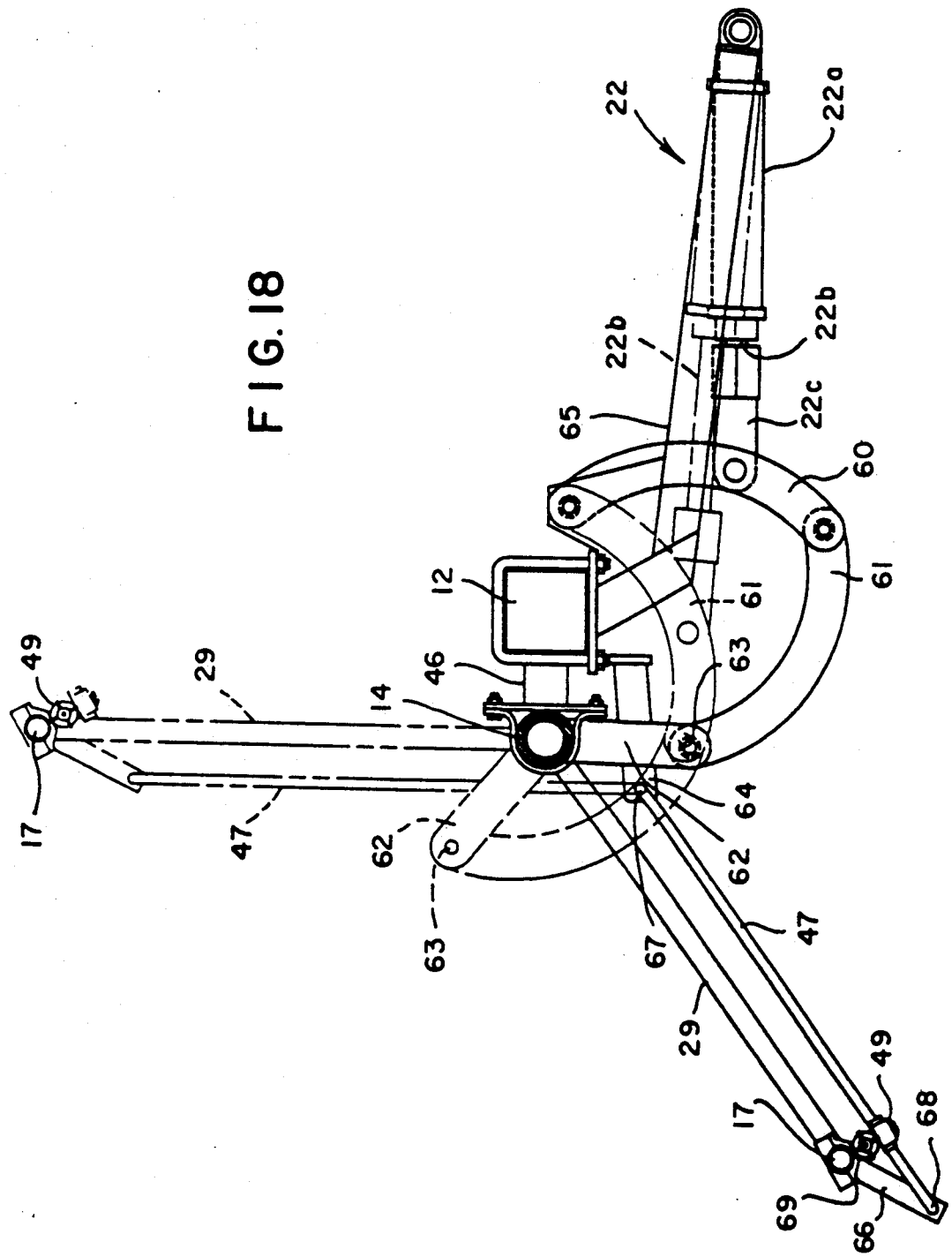
FIG. 18 is a cross-section of the hydraulic system which activates the wet and dry booms from operating to transport position.

FIG. 18 is a cross-section of the left main wing boom (12) in the area where the hydraulic cylinder and mount assembly (22) is attached to the left main wing boom. One notes that the hydraulic cylinder and mount assembly (22) consists of a hydraulic cylinder (22a), a piston (22b) and a piston link arm (22c). The hydraulic cylinder and mount assembly (22) is mounted on a cylinder mounting bracket (65) which is fixedly attached to the left main wing boom (12).

In FIG. 18, the wet spray boom (17) is in the downward operating position. In dotted lines the wet spray boom (17) is positioned vertically such as it normally is in the transport position.

The piston link arm (22c) is pivotally attached to a first semi-circular link arm (60) which is in turn pivotally attached to a second semi-circular link arm (61) which is again pivotally attached to a dry spray boom link arm (62) which is fixedly attached to the dry spray boom (14). When the piston rod (22b) is retracted the wet spray boom (17) is in a downward operating position. The wet fixed boom bracket arm (29) which extends between the wet spray boom (17) and the dry spray boom (14) is fixedly attached to the dry spray boom (14).

The pivotal spray angle rod (47) is pivotally mounted to the spray angle rod link arm (64) at point (67). The purpose of the pivotal spray angle rod (47) is to maintain the nozzle (49) direction at a constant angle from the ground whether the piston (22b) be fully retracted in the downward operating position or in any position between the fully retracted operating position or the fully extended upward transport position. The pivotal spray angle rod (47) is connected pivotally at point (68) to the pivotal spray angle rod link (66) by a pivot (68). The pivotal spray angle rod link (66) is fixedly attached at point (69) to the wet spray boom (17).

Figure 19:
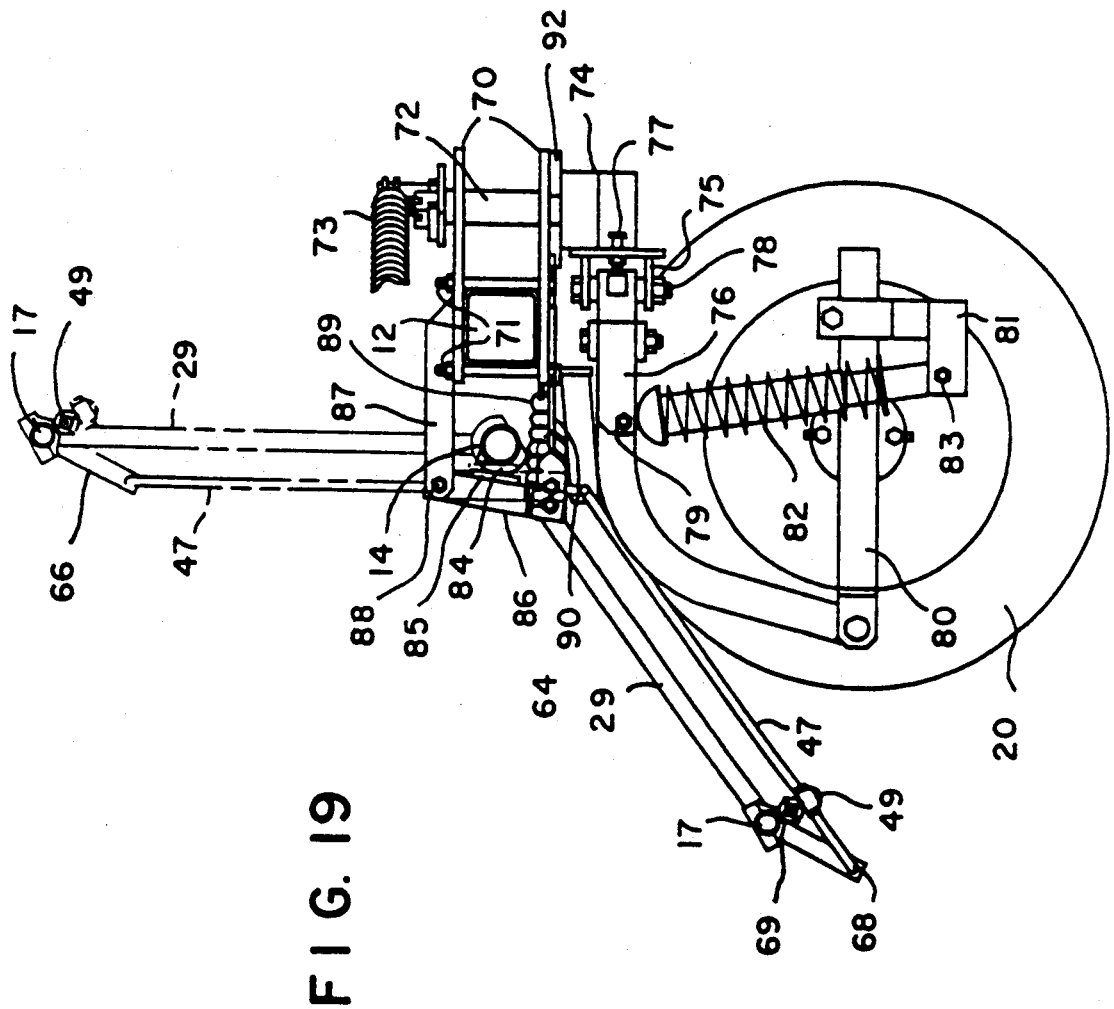
FIG. 19 is a cross-section of the lockable caster wheel area showing the caster wheel when the sprayer is in operating position.

FIG. 19 is a cross-section of the left main wing boom (12) near the area of connection of the outboard caster wheel (20). The wet boom (17) is shown in full lines in the operating position and in dotted lines in the transport position. The caster wheel (20) is depicted in the operating position namely having a direction of travel transverse to the longitudinal axis of the left main wing boom (12). The caster wheel assembly is attached to the left main wing boom (12) by means of a caster wheel assembly mounting bracket (70) which is secured by bolts and nuts (71). The caster wheel assembly is capable of pivoting in a horizontal direction within the caster wheel assembly mounting bracket (70) by means of a vertical shaft (72). A spring (73) extends between the upper portion of the vertical shaft (72) and the left main wing boom (12) urges the caster wheel assembly into the transport position. The vertical shaft for horizontal pivot (72) is fixedly connected to a pivot block (74) below the caster wheel assembly mounting bracket (70). The pivot block (74) is in turn fixedly attached to a pivot block bracket (75) which in turn is attached to an upper caster wheel arm (76). An adjustment screw (77) is used to adjust the toe in or toe out of the caster wheel (20). The upper caster wheel arm (76) is pivotally mounted about pivot (78) and is fixedly connected to the lower caster wheel arm (80) which is fixedly connected to the shock absorber bracket (81). The shock absorber (82) is pivotally mounted by pivot (83) to shock absorber bracket (81) and pivotally mounted by pivot (79) to the upper caster wheel arm (76). In this embodiment shown in FIG. 19 the outboard caster wheel (20) is equipped with a locking mechanism which coincides with the position of the dry boom (14). When the wet boom (17) is in the upright transport position as shown in the dotted lines in FIGS. 19 and 20, the caster wheel (20) will be locked into the transport position. This avoids swaying of the main wing booms while travelling on a road. The mechanism for the locking of the caster wheel is more clearly described in FIG. 20. In both FIGS. 19 and 20 one notes that a cam (84) is mounted on the dry boom (14). The cam (84) is adapted to coordinate with cam plate (85). Cam plate (85) is fixedly attached to cam plate link arm (86) which is pivotally attached to fixed main wing bracket (87) by means of pivot (88). The cam plate link arm (86) is resiliently urged towards the main wing boom (12) by means of a cam plate link arm retention spring (89). At the lower end of the cam plate link arm (86) is pivotally attached a knife (90). The knife (90) is adapted to engage and disengage a pivot locking plate (92) which is fixedly attached to the vertical shaft (72) which is connected to the caster wheel assembly.

As can be seen in FIG. 20, when the wet spray boom is in the lowered operating position the cam (84) by contacting cam plate (85) urges the cam plate link arm (86) outwardly from the main wing boom. In turn knife (90) is disengaged from pivot locking plate (92).

When the wet spray boom (17) is raised upwardly by means of the rotation of the dry boom (14) cam (84) similarly rotates to the position where the flat portion of the cam (93) abuts the surface of cam plate (85) thereby allowing retention spring (89) to move cam plate link arm (86) and knife (90) inwardly and engage with pivot locking plate (92). This occurs when the wet spray boom is in the vertical transport position. When knife (90) is engaged with pivot locking plate (92) caster wheel (20) is locked in the direction of the movement of the sprayer thereby preventing side to side movement along the highway or other path of travel.

In normal spraying operation, the right main spray boom (11) and the left main spray boom (12) are fully extended transverse to the direction of travel of the power source. The pistons (22b) of the cylinders are retracted and the wet spray booms (15), (16), (17) and (18) are in a lowered position extending rearwardly of the dry spray booms (13) and (14).

If the operator wishes to spray with only the right main wing boom (11) the left main wing boom (12) is placed in the transport position. The hydraulic cylinder and mounting assembly (22) on the left main wing boom (12) is activated by the operator by moving the hydraulic actuating means in the cab of the power source and the piston (22b) extended, thereby raising the wet spray boom (17) to a vertical position because of the rotation of the dry spray boom (14). The rotation of the dry spray boom (14) exerts a pulling force on cable (53) thereby pivoting wing hitch latch (43) about pivot pin (56) exerting pressure on spring (54) and releasing latch (43) from locking plate (45). This allows left wing hitch (6) to move rearwardly while wing hitch support arm pivots about pin (38) and left main wing boom (12) moves rearwardly pivoting horizontally about pin (34) when the power source moves the sprayer in the forward direction. Once the outboard wheel (20) on the left main wing boom (12) is aligned with the longitudinal axis of the left main wing boom (12), the locking knife (90) slips into the pivot locking plate (92) thereby locking the outboard wheel in the transport position. This prohibits the left main wing boom from wandering in the trailing transport position.

Similarly, if the operator has finished the spraying using the right main wing boom (11) only, and wishes to place the implement in the full transport position, the cylinder assembly on the right main wing boom (11) is activated from the hydraulic actuating means in the cab and the piston (22b) extended to raise the right outboard and inboard wet spray booms (15) and (16). The latch (43) which is pulled by cable (53) is then released from the locking plate (45). As the operator drives in a forward direction the right main wing boom (11) moves rearwardly.

When the operator is ready to use the sprayer in the operating position, he backs up the sprayer implement causing the main right and left wing booms (11) and (12) to begin to move outwardly at their remote ends. At the same time, the hydraulic cylinder assemblies (12) (which as previously mentioned function independently) are activated by the hydraulic actuating means in the cab and the pistons (22b) retracted. This removes the locking knife (90) from the outboard wheels (20) and lowers the wet spray booms (15), (16), (17) and (18) to the lowered operating position. As the wing hitches (5) and (6) approach the wing hitch brackets (4), the latches (43) move through guides (44) and securely engage themselves on locking plates (45) on both the right and left side of the machine. Thereafter, the sprayer is in position to begin spraying as the left and right main wing booms are held by the wing hitches (5) and (6) and wing hitch brackets (4) in a position transverse to the direction of travel of the implement.

It is understood that the invention is not limited to the embodiment particularly described herein, but rather encompasses all variations of the basic concept.

What we claim as our invention is:

1. A field sprayer implement adapted to be towed by a power source comprising:

a frame supported by wheels and adapted to hold a tank;

a left and right main wing boom pivotally attached to the rear of said frame, said main wing booms detachably connected to the front of said frame by wing hitch assemblies;

said wing hitch assemblies being foldable to maintain a very narrow transport width;

each of said booms being supported by an inboard and an outboard caster wheel;

one of said outboard or said inboard wheels being adapted to be locked in a transport position;

a left and right dry spray boom, respectively mounted on said left and right main wing booms for rotation from a transport to operating position;

said main wing booms and said dry spray booms including joints to permit pivotal movement of said booms over uneven ground;

a plurality of wet spray booms equipped with nozzles; said nozzles being adapted to be directed at a constant angle from the ground regardless of the position of said wet spray booms;

said dry and wet spray booms extending inwardly towards the center of the line of travel of said frame thereby being adapted to apply spray liquid over the entire width of the implement when in the operating position, but being adapted to be placed in a rearwardly folded transport position without interference with one another;

said wet spray booms mounted to said dry spray booms for pivotal movement from a lower operating position to a substantially vertical transport position;

spray actuating means located in the power source for independently actuating a flow of spray liquid to the left and right wet spray booms;

right and left main wing boom hydraulic cylinders operable to raise said wet spray booms;

said wing hitch assemblies being detachably locked to the front of said frame by means of latches and locking plates, said latches being connected to said dry spray booms by means of a cable such that when pistons of said hydraulic cylinders are extended, said dry spray booms are rotated to the transport position and said latches are pivotally lifted, thereby detaching said wing hitches from said frame;

wherein in operation said right and left main wing boom hydraulic cylinders are independently actuated by actuating means located within a cab of the power source to simultaneously raise said wet spray booms, release said wing hitches from said frame and lock one of said outboard or said inboard caster wheels when said implement is in the transport position, and conversely said hydraulic cylinders lower said spray booms and unlock said caster wheels when said implement is moved to the operating position; and thus said sprayer implement is capable of spraying with one main wing boom only in the transverse operating position while the other is in the transport position, thereby permitting the operator to avoid obstacles in spraying areas not accessible when both wing booms are in the transverse operating position.

2. A sprayer as claimed in claim 1 wherein said locking plates are pivotally released from a vertical locking position to an unlocked position while said locking plate is being maintained in the vertical position by resilient means during normal operating conditions but adapted to overcome said resilient means and move to the unlocked position when an extreme force is applied to said main wing booms, thereby avoiding damage to the implement.

3. A sprayer as claimed in claim 1 wherein said dry spray boom is equipped with a cam;

said cam being adapted to engage a cam plate;

said cam plate being mounted on a cam plate link arm equipped with a locking knife;

said locking knife adapted to engage a pivot locking knife;

said pivot locking plate mounted on a vertical shaft of a lockable caster wheel;

wherein operation, when said dry boom is rotated to the transport position, said lockable caster wheel is locked.

4. A field sprayer implement adapted to be towed by a power source comprising:

a frame supported by wheels and adapted to hold a tank;

left and right main wing booms, each pivotally attached to the rear of said frame, said main wing booms detachably connected to the front of said frame;

each of said booms being supported by at least one wheel;

a plurality of wet spray booms equipped with nozzles and carried by said left and right main wing booms;

said main wing booms including joints to permit pivotal movement of said booms over uneven ground;

said wet spray booms extending inwardly towards the center of the line of travel of said sprayer thereby being adapted to apply spray liquid over the entire width of the implement when in the operating position, but being adapted to be placed in a rearwardly folded transport position without interference with one another;

said wet spray booms mounted for pivotal movement from a lower operating position to a substantially vertical transport position; and spray actuated means located in the power source for independently actuating a flow of spray liquid to the left and right wet spray booms;

said sprayer implement being capable of spraying with one main wing boom only in the transverse operating position while the other is in the transport position, thereby permitting the operator to avoid obstacles in spraying areas not accessible when both wing booms are in the transverse operating position.

* * * * *